(12) United States Patent
Guberman (10) Patent No.: US 10,290,229 B1
(45) Date of Patent: May 14, 2019

(54) ASSISTIVE READING DEVICE

(71) Applicant: Joshua B Guberman, Chicago, IL (US)

(72) Inventor: Joshua B Guberman, Chicago, IL (US)

(*) Notice: Subject to any disclaimer, the term of this patent is extended or adjusted under 35 U.S.C. 154(b) by 314 days.

(21) Appl. No.: 15/347,771

(22) Filed: Nov. 9, 2016

(51) Int. Cl.
*G09B 21/00* (2006.01)
*G09B 5/04* (2006.01)

(52) U.S. Cl.
CPC ............ *G09B 21/006* (2013.01); *G09B 5/04* (2013.01)

(58) Field of Classification Search
CPC .................................. G09B 21/00; G09B 5/04
See application file for complete search history.

(56) References Cited

U.S. PATENT DOCUMENTS

| | | | | |
|---|---|---|---|---|
| 6,085,125 A * | 7/2000 | Genov | .................. | H01L 21/681 414/226.05 |
| 2003/0020629 A1* | 1/2003 | Swartz | .................... | G06F 1/163 340/4.41 |
| 2008/0107309 A1* | 5/2008 | Cerni | ................. | G06K 9/00033 382/115 |
| 2008/0226134 A1* | 9/2008 | Stetten | .................... | G06F 3/014 382/114 |
| 2013/0308835 A1* | 11/2013 | Thorson | ............ | H04M 1/72563 382/118 |
| 2015/0237181 A1* | 8/2015 | Khan | .................. | H04M 1/0202 455/556.1 |
| 2016/0171907 A1* | 6/2016 | Moore | ................. | G09B 21/001 434/116 |
| 2016/0313798 A1* | 10/2016 | Connor | ................... | G06F 3/017 |
| 2016/0317060 A1* | 11/2016 | Connor | ............... | A61B 5/4866 |

OTHER PUBLICATIONS

Roy Shilkrot et al., FingerReader: A Wearable Device to Support Text Reading on the Go, Proceeding CHI EA '14 CHI '14 Extended Abstracts on Human Factors in Computing Systems, pp. 2359-2364, Apr. 26, 2014.
Roy Shilkrot et al., FingerReader: A Wearable Device to Explore Printed Text on the Go, Proceeding CHI '15 Proceedings of the 33rd Annual ACM Conference on Human Factors in Computing Systems pp. 2363-2372, Apr. 18, 2015.

* cited by examiner

*Primary Examiner* — Eddy Saint-Vil
(74) *Attorney, Agent, or Firm* — McDonnell Boehnen Hulbert & Berghoff LLP (57) ABSTRACT

An example system includes a flexible sleeve to be worn on a user's finger. A first end of the flexible sleeve is disposed near a tip of the finger. The system also includes a camera disposed at the first end of the flexible sleeve atop the finger. A lens of the camera is pointed distally along the finger. The system additionally includes a proximity-sensing device disposed at the first end of the flexible sleeve and configured to generate a proximity signal when brought within a threshold distance of an object. The system further includes a computing device connected to the flexible sleeve and configured to receive the proximity signal indicating that the object is within the threshold distance of the proximity-sensing device. While the object is within the threshold distance, the computing device receives image data from the camera and subsequently transmits the image data.

20 Claims, 6 Drawing Sheets

ASSISTIVE READING DEVICE

BACKGROUND

Dyslexia is characterized by trouble with reading despite normal intelligence and may affect different individuals to varying degrees. Dyslexic individuals may have difficulties in reading words, writing words, spelling words, "sounding out" words in their head, pronouncing words aloud, and/or understanding what the individual reads. Dyslexia may be caused by both genetic and environmental factors and is commonly first diagnosed at school. The onset of dyslexia may also take place during adulthood following traumatic brain injury, stroke, or dementia.

SUMMARY

In one example, a system is provided that includes a flexible sleeve to be worn on a finger of a user. A first end of the flexible sleeve is disposed near a tip of the finger. The system also includes a camera disposed at the first end of the flexible sleeve atop the finger. A lens of the camera is pointed distally along the finger. The system additionally includes a proximity-sensing device disposed at the first end of the flexible sleeve. The proximity-sensing device is configured to generate a proximity signal when an object is within a threshold distance of the proximity-sensing device. The system further includes a computing device connected to the flexible sleeve and configured to receive, from the proximity-sensing device, the proximity signal indicating that the object is within the threshold distance of the proximity-sensing device. The computing device is also configured to receive image data from the camera while the object is within the threshold distance. The computing device is additionally configured to transmit the image data.

In another example, a method is provided that includes receiving, by a computing device, a proximity signal from a proximity-sensing device indicating that an object is within a threshold distance of the proximity-sensing device. The proximity-sensing device is disposed at a first end of a flexible sleeve to be worn on a finger of a user. The first end of the flexible sleeve is disposed near a tip of the finger. The computing device is connected to the flexible sleeve. The method further includes, receiving, by the computing device, image data from a camera disposed at the first end of the flexible sleeve atop the finger while the object is within the threshold distance. A lens of the camera is pointed distally along the finger. The method additionally includes transmitting, by the computing device, the image data.

In an additional example, a non-transitory computer readable storage medium is provided having stored thereon instructions that, when executed by a computing device, cause the computing device to perform operations. The operations include receiving, from a proximity-sensing device, a proximity signal indicating that an object is within a threshold distance of the proximity-sensing device. The proximity-sensing device is disposed at a first end of a flexible sleeve to be worn on a finger of a user. The first end of the flexible sleeve is disposed near a tip of the finger. The operations also include receiving image data from a camera disposed at the first end of the flexible sleeve atop the finger while the object is within the threshold distance. A lens of the camera is pointed distally along the finger and the image data represents text. The operations additionally include identifying one or more words within the image data. The operations further include producing an audible representation of the one or more words within the image data by one or more speakers.

In a further example, a system is provided the includes means for receiving, from a proximity-sensing device, a proximity signal indicating that an object is within a threshold distance of the proximity-sensing device. The proximity-sensing device is disposed at a first end of a flexible sleeve to be worn on a finger of a user. The first end of the flexible sleeve is disposed near a tip of the finger. The system also includes means for receiving image data from a camera disposed at the first end of the flexible sleeve atop the finger while the object is within the threshold distance. A lens of the camera is pointed distally along the finger and the image data represents text. The system additionally includes means for identifying one or more words within the image data. The system further includes means for producing an audible representation of the one or more words within the image data.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. Overview

Example embodiments are provided herein of a reading device. The reading device may include a camera and a computing device implemented in a form factor of a flexible sleeve to be worn about a finger of a user. For example, the reading device may be used to assist individuals with reading disabilities (e.g., dyslexia), individuals learning to read for the first time, blind individuals, and/or individuals learning a new language. In particular, the reading device may be used to scan in one or more words that the user is having difficulty reading and/or pronouncing. The scanned words may be recognized using optical character recognition, converted to audible representation using text-to-speech processing, and pronounced to the user by one or more speakers.

The reading device may include the camera connected to the flexible sleeve. A lens of the camera may be positioned distally along the finger such that surfaces (e.g., pages of text) pointed at by the finger may be scanned by the camera. The reading device may additionally include a proximity-sensing device that generates a proximity signal when an object or surface is close enough (e.g., within a threshold distance) to be scanned by the camera. The computing device of the reading device may activate the camera and receive image data while the proximity signal is being generated. Alternatively, image capture may be initiated in response to a transient proximity signal. Image capture may continue until the proximity-sensing device generates an out-of-proximity signal indicating that the surface is no longer close enough to the camera to be scanned.

In some embodiments, the flexible sleeve may additionally include one or more flex or strain sensors to indicate an orientation of the user's finger (e.g., bent, straight). Accordingly, data from the flex/strain sensors may trigger activation or deactivation of the camera. For example, the reading device may be configured to initiate image capture when the finger is within a threshold distance of a surface and the finger is in a particular pose. The pose may be defined as the angle between one or more sections of the user's finger (e.g., the distal phalange, the intermediate phalange, or the proximal phalange) as detected by the flex or strain sensors. Thus, unintended image capture may be reduced.

The reading device may additionally include an illumination device (e.g., light emitting diode) and a visual feedback device indicating a field of view of the camera, such as by projecting a light pattern indicating the boundaries of the field of view. The illumination device and the visual feedback device may be pointed distally along the finger in the same manner as the camera. The illumination and visual feedback devices may be disposed near the camera or on top of the camera. In some embodiments, the illumination and visual feedback devices may be one device. For example, the light field emitted by the illumination device may be shaped to diverge to the same extent as the field of view of the camera. Much like the camera, the illumination and visual feedback devices may be triggered based on the proximity and out-of-proximity signals.

In some embodiments, the reading device may include a communication interface having a wireless transmitter configured to communicate with a computing device. The captured image data may be transferred to the remote computing device. The computing device may be configured to identify one or more words within the image data, convert the words to audible representations, and sound-out the audible representations for the user to hear. Thus, a user incapable of reading and/or pronouncing one or more words may use the assistive reading device to aid the user's reading and/or understanding of the words.

II. Example Assistive Reading System

Figure 1:
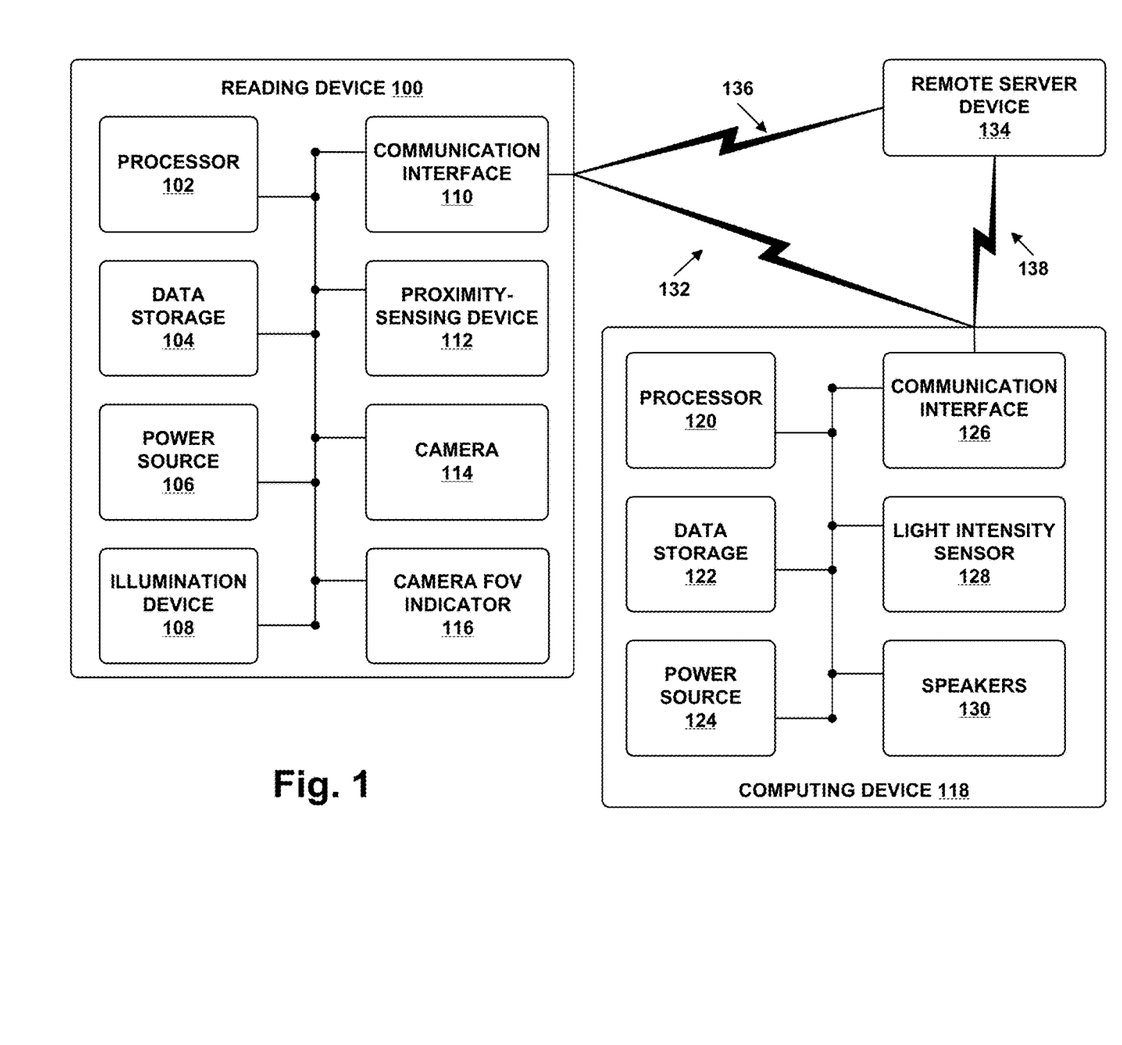
FIG. 1 illustrates a block diagram of a system to assist reading, according to an example embodiment.

Referring now to the Figures, FIG. 1 illustrates an example system for assisting a user in reading text. In one embodiment, the system may include reading device 100, computing device 118, and remote server device 134. Reading device 100 and computing device 118 may be communicatively connected by wireless air interface 132 (e.g., BLUETOOTH®). Reading device 100 and remote server device 134 may be communicatively connected by wireless air interface 136 (e.g., WI-FI®). Likewise, computing device 118 and remote server device 134 may be communicatively connected by wireless air interface 138 (e.g., WI-FI®). In some embodiments, reading device 100 may communicate with remote server device through computing device 118 (e.g., using wireless air interfaces 132 and 138). In one example, reading device 100 may be a low-power portable electronic device used to acquire images of text. The images of text may be transmitted to computing device 118 configured to identify and sound-out the words in the text. In some examples, reading device 118 may be used to assist individuals with reading disabilities (e.g., dyslexia), individuals learning to read for the first time, blind individuals, and/or individuals learning a new language.

For purposes of example, FIG. 1 illustrates a simplified block diagram showing some of the components of reading device 100 and computing device 118. FIG. 1 additionally illustrates an example remote server device 134 known to those skilled in the art. Remote server device 134 may include some or all of the components of computing device 118. The methods, operations, and/or example embodiments described herein may be performed by reading device 100, computing device 118, remote server device 134, or a combination thereof. It should be understood that reading device 100, computing device 118, and remote server device 134 may represent combinations of hardware and software that are configured to carry out the operations herein disclosed.

Figure 2:
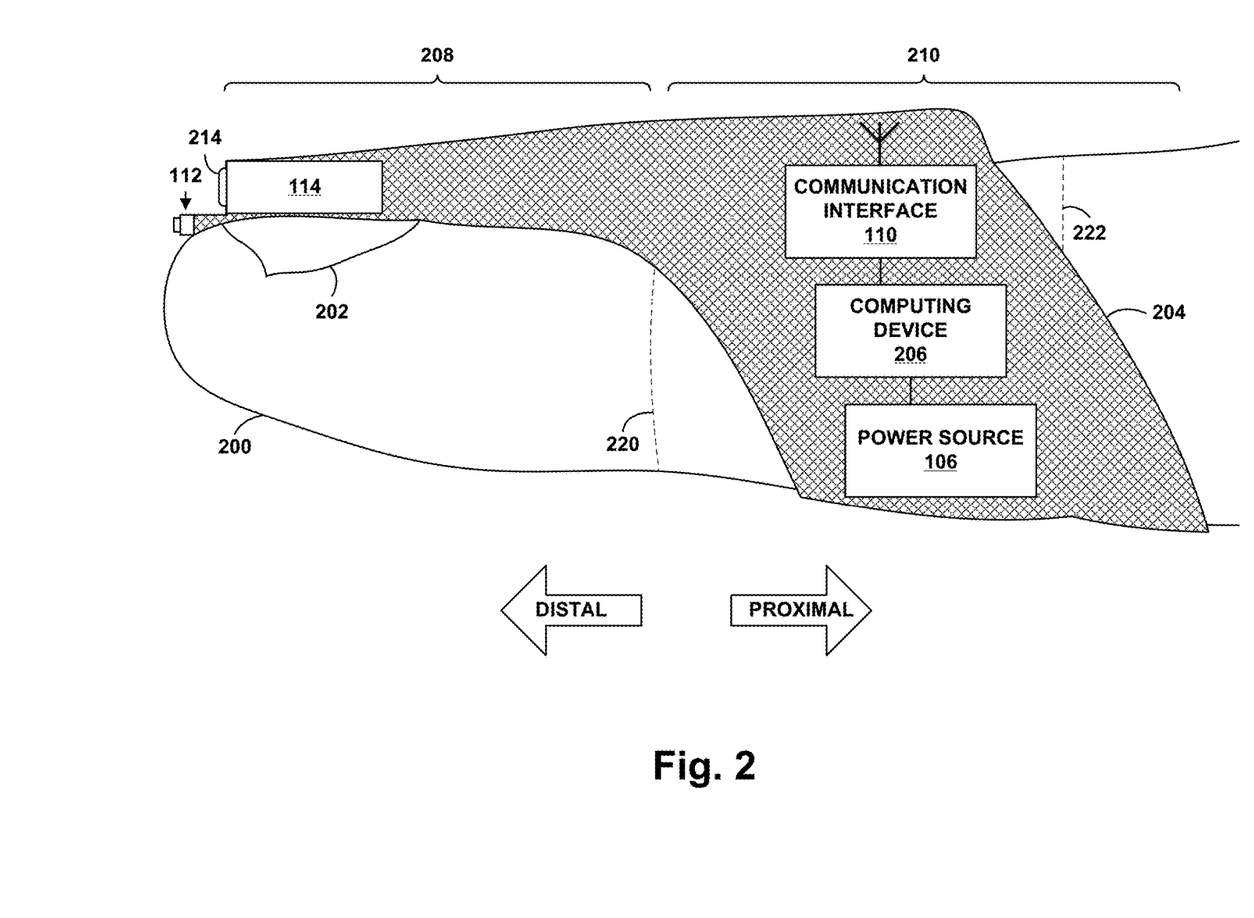
FIG. 2 illustrates a side view of an example form factor of an assistive reading device, according to an example embodiment.

In one embodiment, reading device 100 may be implemented in a form factor of a flexible sleeve (e.g., a cylindrical ring) to be worn on a finger of a user, as illustrated in FIG. 2. In particular, components of reading device 100 may be integrated into flexible sleeve 204 to be worn about finger 200. Flexible sleeve 204 may be considered to include at least two sections—section 208 and section 210. Section 210 may be a section of flexible sleeve 204 to be worn about an intermediate phalange of the finger of the user (i.e., the portion of finger 200 between dashed lines 220 and 222 as shown in FIG. 2). Section 208 may be a section of flexible sleeve 204 extending from cylindrical ring section 210 over at least a portion of a distal phalange of finger 200.

Computing device 118 may take the form of a tablet computer, desktop computer, embedded computing device, laptop computer, smartphone, smartwatch, a smart television, or some other form. Computing device 118 may be programmed to communicate with reading device 100 and perform the operations herein described in coordination with reading device 100.

As shown in FIG. 1, reading device 100 may include processor 102, data storage 104, power source 106, illumination device 108, communication interface 110, proximity-sensing device 112, camera 114, and camera field-of-view (FOV) indicator 116. Processor 102 and data storage 104 may collectively make up computing device 206, as illustrated in FIG. 2. Computing device 118 may include processor 120, data storage 122, power source 124, communication interface 126, light intensity sensor 128, and speakers 130. In some embodiments, each of devices 100 and 118 may include respective user interfaces to allow a user to provide input to interact and control the devices and/or to receive output from the devices visually, audibly, and/or haptically. Further, as will be apparent to those skilled in the art, the elements of reading device 100 and computing device 118 may be combined or interchanged among the devices without affecting the devices' ability to perform the operations herein described.

Processors 102 and 120 may comprise one or more general purpose processors (e.g., microprocessors) and/or one or more special purpose processors such as, for example, digital signal processors (DSPs), graphics processing units (GPUs), floating point units (FPUs), network processors, or application-specific integrated circuits (ASICs).

Data storage 104 and 122 may include one or more volatile and/or non-volatile storage components, such as magnetic, optical, flash, or organic storage, and may be integrated in whole or in part with respective processors 102 and 120. Data storage 104 and 122 may include removable and/or non-removable components.

Processors 102 and 120 may be capable of executing program instructions (e.g., compiled or non-compiled program logic and/or machine code) stored in data storage 104 and 122, respectively, to carry out the various operations described herein. Therefore, data storage 104 and 122 may include one or more non-transitory computer-readable media, having stored thereon program instructions that, upon execution by processor 102 or processor 120, respectively, cause respective device 100 or 118 to carry out any of the methods, processes, or operations disclosed in this specification and/or the accompanying drawings.

Communication interfaces 110 and 126 may allow respective reading device 100 and computing device 118 to communicate, using analog or digital modulation, with other devices, access networks, and/or transport networks. Thus, communication interfaces 110 and 126 may facilitate circuit-switched and/or packet-switched communication, such as plain old telephone service (POTS) communication and/or Internet protocol (IP) or other packetized communication.

For instance, communication interfaces 110 and 126 may include a chipset and antenna arranged for wireless communication with a radio access network or an access point. Also, communication interfaces 110 and 126 may take the form of or include a wireline interface, such as an Ethernet, Universal Serial Bus (USB), or High-Definition Multimedia Interface (HDMI) port. Communication interfaces 110 and 126 may also take the form of or include a wireless interface, such as a WI-FI®, BLUETOOTH®, global positioning system (GPS), or wide-area wireless interface (e.g., WiMAX or 3GPP™ Long-Term Evolution (LTE™)). However, other forms of physical layer interfaces and other types of standard or proprietary communication protocols may be used over communication interfaces 110 and 126. Furthermore, communication interfaces 110 and 126 may comprise multiple physical communication interfaces (e.g., a WI-FI® interface, a BLUETOOTH® interface, and a wide-area wireless interface).

By way of example, program instructions stored in data storage 104 and 122 may include an operating system (e.g., an operating system kernel, device driver(s), and/or other modules) and one or more application programs (e.g., camera functions, image processing functions, address book, email, web browsing, social networking, and/or gaming applications) installed on the respective device. Similarly, data stored in data storage 104 and 122 may include operating system data and application data. Operating system data may be accessible primarily to the operating system, and application data may be accessible primarily to one or more of the application programs. Application data may be arranged in a file system that is visible to or hidden from a user of the respective devices 100 and 118.

Power sources 106 and 124 may include rechargeable batteries (e.g., lithium-ion), supercapacitors (e.g. electric double-layer capacitors), solar panels, and/or wireless power units (e.g., inductive coils). Power sources 106 and 124 may allow respective devices 100 and 118 to be portable and function without a wired power connection for a period of time. In one example, power source 106 (e.g., rechargeable lithium ion battery) may be disposed within cylindrical ring section 210 of flexible sleeve 204 shown in FIG. 2. In this example, power source 106 may be flexible and may thus conform to the contours of finger 200 when flexible sleeve 204 is worn by a user. Power source 106 or a portion thereof may also be disposed within section 208 of flexible sleeve 204 (e.g., when a larger battery is used to provide reading device 100 with a longer runtime).

Reading device 100 may additionally include proximity-sensing device 112 configured to generate a proximity signal when an object is within a threshold distance of the proximity-sensing device. Proximity-sensing device 112 may also be configured to generate an out-of-proximity signal indicating that the object is not within the threshold distance of the proximity-sensing device. In some embodiments, proximity-sensing device 112 may be configured to generate a distance signal indicative of the distance between proximity-sensing device 112 and an object or surface. Processor 102 may be programmed to determine when the signal generated by proximity-sensing 112 indicates that the object is within the threshold distance.

As illustrated in FIG. 2, proximity-sensing device 112 may be connected to the distal end of section 208 of flexible sleeve 204 to be worn near the tip of finger 200 (e.g., near finger nail 202). In the orientation illustrated in FIG. 2, proximity sensing device 112 may be configured to sense distance in the distal direction. Thus, proximity-sensing device 112 and, specifically, the sensing element of proximity-sensing device, may be pointed distally along finger 200. Thus, the proximity signal may indicate when an object or surface distal to finger 200 is within a threshold distance of the tip of finger 200. In one example, proximity-sensing device 112 may include a button configured to generate the proximity signal when the button is brought into physical contact with an object. In other examples, proximity-sensing device 112 may measure proximity based on time-of-flight of an acoustic or electromagnetic wave. For example, proximity-sensing device 112 may include a sound navigation and ranging (SONAR) device, a radio detection and ranging (RADAR) device, and/or a light detection and ranging (LIDAR) device. The proximity signal may be generated when the measured time-of-flight falls below a threshold time-of-flight value.

Reading device 100 may further include camera 114. Camera 114 may be connected to flexible sleeve 204 and disposed atop and near the tip of finger 200 as shown in FIG. 2. Lens 214 of camera 114 may be pointed distally along finger 200 to capture image frames (e.g., photo or video) of objects or scenes pointed at by the finger (e.g., text in a region of a page pointed to by the finger). In some embodiments, camera 114 may be recessed from the tip of finger 200 to provide a gap between lens 214 of camera 114 and the object or scene when tip of finger 200 is brought into physical contact with the object. Thus, camera 114 may scan the object, without being obscured or obstructed, when the tip of finger 200 is brought into contact with the object.

Computing device 206 may be configured to initiate capture of image data by camera 114 in response to receiving the proximity signal from proximity-sensing device 112. While the object or scene is within the threshold distance, computing device 206 may receive image data from camera 114. Communication interface 110 may be used to transmit, subsequently or in parallel, the image data to computing device 118. In response to receiving the out-of-proximity signal from proximity-sensing device 112, computing device 206 may deactivate camera 114.

Illumination device 108 (not shown in FIG. 2) may be connected to the flexible sleeve and pointed distally along the finger in the same direction as camera 114. Illumination device 108 may be configured to light the object or scene to be scanned by camera 114. In some examples, illumination device 108 may light up in response to receiving the proximity signal from proximity-sensing device 112. Accordingly, reading device 100 may conserve energy by activating illumination device 108 when the object is within a scanning range of camera 114 (e.g., within the threshold distance of the proximity sensing device). When the object is not within the scanning range of camera 114, illumination device 108 may be deactivated.

In some embodiments, reading device 100 may be configured to receive data indicative of ambient light intensity from light intensity sensor 128 of computing device 118. Based on the ambient light intensity, reading device 100 may modulate an intensity with which illumination device 108 lights the object. In some embodiments, light intensity sensor 128 may be a component of reading device 100. Computing device 118 may be located proximate to reading device 100 (e.g., device 118 may be a smartphone or other computing device nearby to the user of reading device 100). Accordingly, reading device 100 and computing device 118 may be subject to similar lighting conditions within an environment occupied by the user. Thus, light intensity sensor 128 may be used to estimate the lighting conditions near reading device 100. In one example, the intensity with which illumination device 108 lights an object may be modulated in inverse proportion to the ambient light intensity detected by light intensity sensor 128.

Reading device 100 may further include a camera FOV indicator 116 (i.e., a visual feedback device) disposed at the first end of the flexible sleeve. Camera FOV indicator 116 may be configured to project an indication of a field of view of camera 114 to allow the user of reading device 100 to aim camera 114 at regions of interest (e.g., one or more words within a plurality of words on a page). Camera FOV indicator 116 may use LEDs or lasers to project a pattern of light (e.g., a rectangular pattern, an elliptical pattern) indicating the FOV. Much like illumination device 108, camera FOV indicator 116 may be activated in response to receiving the proximity signal from the proximity-sensing device and may be deactivated in response to receiving the out-of-proximity signal. In some embodiments, illumination device and camera FOV indicator 116 may be integrated into a single device that structures the emitted light to define the expanse of the FOV of camera 114.

Computing device 118 may be configured to generate audible representations, such as but not limited to audible representations of words scanned by reading device 100. Computing device 118 may include one or more speakers 130 for producing audible representations of words recognized in images captured by assistive reading device 100. Alternatively, in some embodiments, speakers 130 may be included on reading device 100 or may be wirelessly connected to one or more of devices 100 and 118 (e.g., speakers 130 may be embodied in wireless headphones). Including speakers 130 on reading device 100 and/or wireless connections to speakers 130 may allow for audible representations of scanned words to be produced closer to, and so be more easily heard by a user of reading device 100. Additionally, the inclusion of speakers 130 directly on reading device 100 may allow reading device 100 to operate independently of any additional computing devices, such as computing device 118 (i.e., when reading device 100 is configured to recognize words within scanned text).

Computing device 118 may additionally be configured to generate audible representations in a target language other than the language in which text recognized by computing device 118 is written. Thus, computing device 118 may operate in coordination with reading device 100 as a translator. In particular, computing device 118 may receive, by way of a user interface, an indication of a target language to which text is to be translated. Computing device 118 may perform optical character recognition on the received image data followed by translation of the recognized word or series of words. The translated words may then be processed to generate visual, textual, and/or audible representations of the words in the target language.

In some embodiments, remote server device 134 may be configured to perform some or all of the operations of character recognition, translation, and text-to-speech processing. Computing device 118 may serve as a communications gateway between reading device 100 and remote server device 134 (e.g., when reading device 100 is not configured to communicate with remote server device 134 directly). Thus, reading device 100 may provide the image data to computing device 118, which may in turn forward the image data to server device 134 for processing. Server device 134 may process the image data to generate a file containing the audible representation of the text contained in the image data. Server 134 may then send the file to computing device 118, which may play the file through one or more speakers to produce the audible representation. Alternatively, computing device may forward the file to reading device 100 to be played through one or more speakers on reading device 100.

Figure 3:
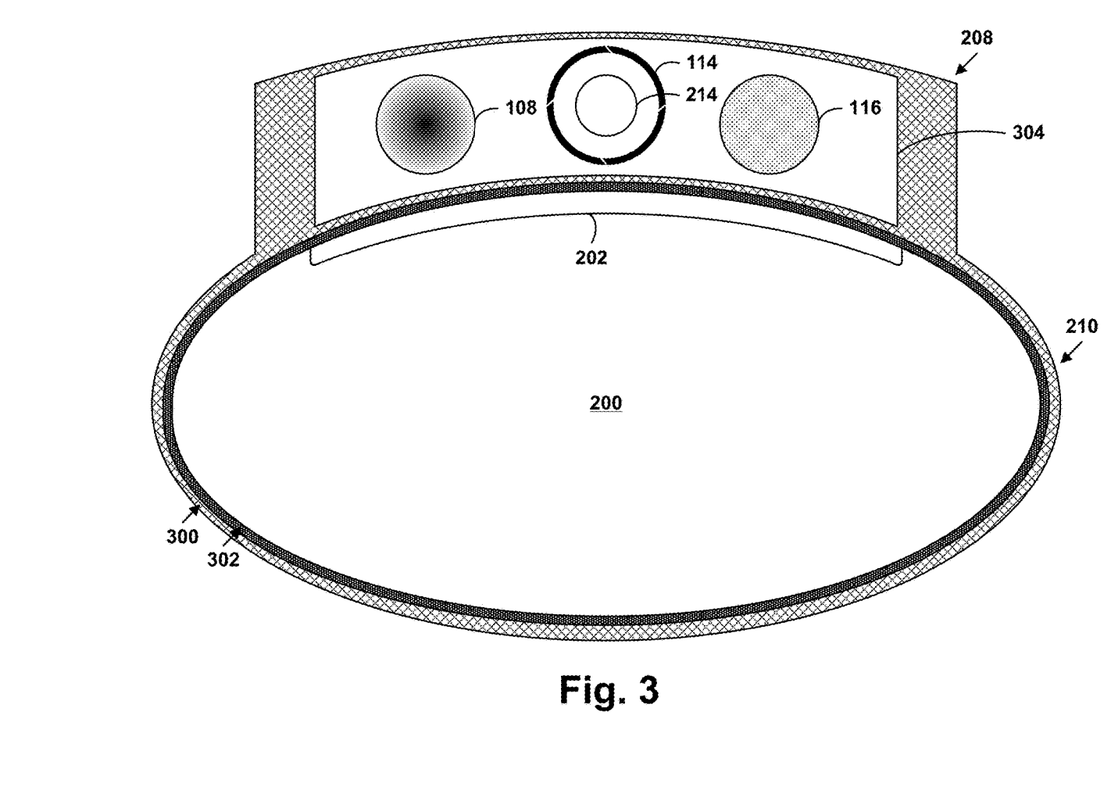
FIG. 3 illustrates a head-on view of the assistive reading device, according to an example embodiment.

FIG. 3 illustrates a head-on view (i.e., looking proximally at the tip of finger 200) of flexible sleeve 204 worn about finger 200. Section 210 is shown surrounding finger 200 completely to retain flexible sleeve 204 on finger 200. Section 208 is shown disposed on top of, but not surrounding, finger 200. Instead, section 208 functions to position camera 114, illumination device 118, camera FOV indicator 116, and proximity-sensing device 112 in their respective operational positions near the tip of finger 200.

FIG. 3 shows an example arrangement of camera 114, illumination device 108, and camera FOV indicator 116 within flexible sleeve 204. Camera 114, illumination device 108, and camera FOV indicator 116 may be disposed within a rigid assembly 304. Rigid assembly 304 may maintain the relative positioning between camera 114, illumination device 108, and camera FOV indicator 116 to allow camera FOV indicator 116 to accurately represent the FOV of camera 114 and to allow illumination device 108 to light up the region within the FOV of camera 114. In some embodiments, rigid assembly 304 may be curved to match the contours of finger 200.

Flexible sleeve 204 may include two or more layers of fabric, such as layers 300 and 302 shown in FIG. 3. Layer 300 may define the outer boundary of the flexible sleeve 204 and layer 302 may define the inner boundary of flexible sleeve 204. The fabric layers may be flexible and elastic to accommodate a range of sizes of fingers. The choices of fabric can enhance the comfort of use of reading device 100 to allow reading device 100 to be worn on the finger for prolonged periods of time.

In some embodiments, layers 300 and 302, as well as one or more additional layers not herein illustrated, may be made from different materials. For example, layer 302 may be made from cotton while layer 300 may be made from elastic, nylon, or some other protective material. In some embodiments, layers 302 and 300 may additionally or alternatively be made from LYCRA®, spandex, elastane, or COOLMAX®. Breathable fabrics may reduce the risk of chafing and other injury caused by friction between finger 200 and flexible sleeve 204.

Additionally, materials with antibacterial properties may be included in layers 300 and 302. For example, layers 300 and/or 302 may include nanowires loaded with silver-tetracyanoquinodimethane (TCNQ) to combat growth of bacteria while flexible sleeve 204 is worn on the finger. Antibacterial fabrics may make reading device 100 more sanitary to use, possibly allowing reading device 100 to be shared among multiple users (e.g., in an educational setting where a reading device owned by an institution is shared among multiple users). Antibacterial fabrics may additionally reduce the need for external sanitation means/agents, thus reducing the risk of electronic hardware damage by exposure to liquid cleaning agents. Further, each of layers 300 and 302 may include more than one material. For example, portions of flexible sleeve 204 that undergo stretching and bending (e.g., portions near dashed lines 220 and 222 shown in FIG. 2) may be made of a more flexible material than other portions.

Assembly 304 may be partially disposed between fabric layers 300 and 302. Additionally, the other components of reading device 100 described with respect to FIGS. 1 and 2 (e.g., computing device 206, power source 106) may be partially or wholly disposed between layers 300 and 302 to protect the components from damage and conceal them from the user, thus making the device more comfortable, convenient, reliable, and visually appealing to wear and use. In other embodiments, flexible sleeve 204 may include one layer of fabric.

III. Example Operations

Figure 4:
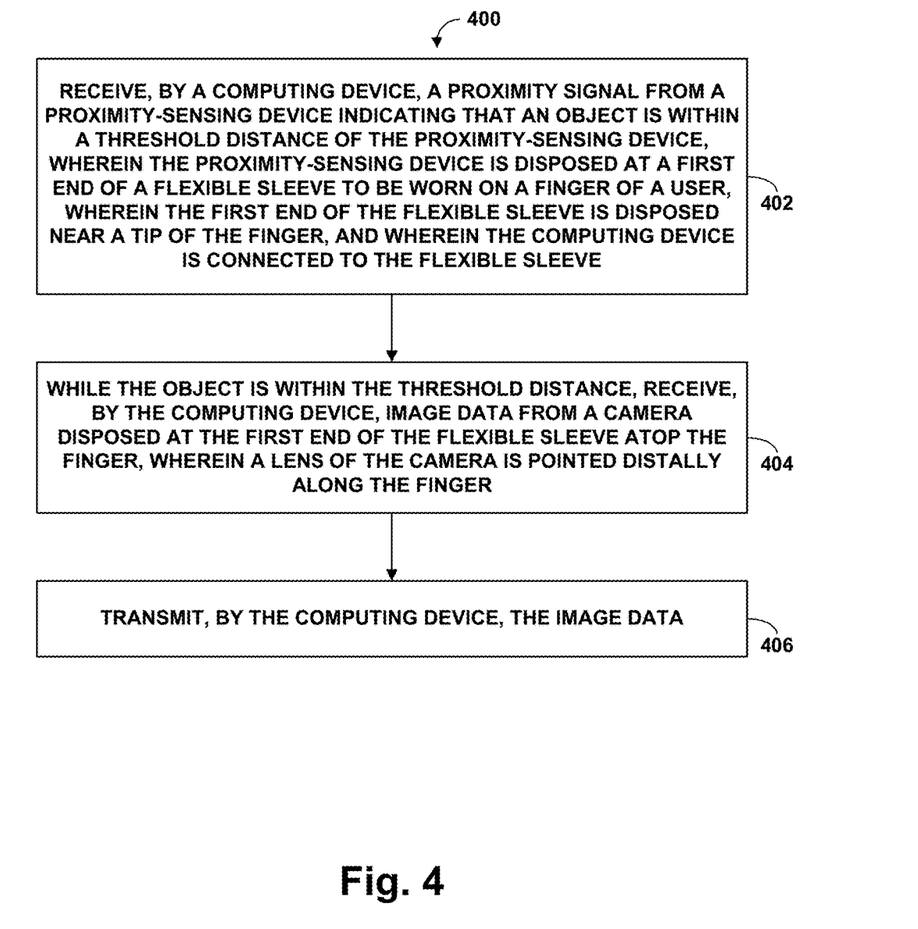
FIG. 4 illustrates a flow diagram, according to an example embodiment.

FIG. 4 illustrates a flow diagram 400 of example operations of a method that may be performed by the herein-disclosed reading device, such as reading device 100 perhaps operating in conjunction with computing device 118. Although the blocks of flow diagram 400 are illustrated in sequential order, these blocks may also be performed in parallel, and/or in a different order than that described herein. The various blocks may be combined into fewer blocks, divided into additional blocks, and/or removed in a particular implementation.

The method may begin at block 402. In block 402, a computing device, such as reading device 100, computing device 206 of the reading device shown in FIG. 2, or computing device 118, may receive a proximity signal from a proximity-sensing device indicating that an object is within a threshold distance of the proximity-sensing device. Example proximity signals are discussed above with respect to FIGS. 1, 2, and 3. The proximity-sensing device may be disposed at a first end of a flexible sleeve to be worn on a finger of a user. The first end of the flexible sleeve may be disposed near a tip of the finger. The flexible sleeve may be similar to those illustrated in FIGS. 1, 2, and 3. The computing device may be connected to or disposed between layers of the flexible sleeve. The object may be, for example, a page of a book or magazine. Alternatively, the object may be a food item with a label thereon that a user would like to scan.

In block 404, while the object is within the threshold distance, the computing device may receive image data from a camera disposed at the first end of the flexible sleeve atop the finger. A lens of the camera may be pointed distally along the finger to scan objects pointed at by the finger.

As discussed with respect to FIGS. 1, 2, and 3, image data may be received from the camera while the object is within the threshold distance to reduce the amount of energy used by the device. When the object is not within the threshold distance, the camera may be disabled. A visual feedback device such as, for example, visual feedback device 116 discussed above with respect to FIGS. 1, 2, and 3 may aid the user in controlling the finger to point the camera at specific words or series of words that the user desires to scan, without drifting onto words that the user does not desire to scan. In particular, visual feedback device 116 may allow the user to see exactly what is being scanned by projecting a light pattern indicating the boundary of the camera's field of view so that the user can sequentially scan words in one line of text without drifting to other lines of text. Thus, the user may scan an entire sentence without scanning words out of order or drifting into other lines that are not part of the sentence.

In block 406, the computing device may transmit the image data. The image data may represent text. The image data may be transmitted to a second computing device configured to receive the data, identify one or more words within the text, and produce an audible representation of the one or more words. In particular, the image data may be continuously transmitted to the second computing device after scanning. The image data may be cached or buffered by the second computing device to be analyzed in a first-in-first-out order. The second computing device may identify the words within the image data using one or more optical character recognition (OCR) algorithms such as matrix matching or feature extraction followed by nearest neighbor classification. The second computing device may then generate the audible representations of the recognized words in the first-in-first-out order to maintain coherency in the meaning of the scanned text and thus aid a user in reading. The audible representation may be generated immediately after scanning and processing the image data to reduce or minimize the delay between a user scanning text and hearing the audible representation.

Further, in some embodiments, the computing device may additionally be configured to receive an indication of a target language to which to translate the words recognized within the image data. The indication may be provided by way of a user interface of the computing device or the assistive reading device worn about the user's finger. The recognized words may be translated into the target language and an audible representation of the words in the target language may be produced. The audible representations may be produced by speakers on the computing device, speakers on the assistive reading device, or wireless speakers communicatively connected to the computing device or the assistive reading device.

Figure 5:
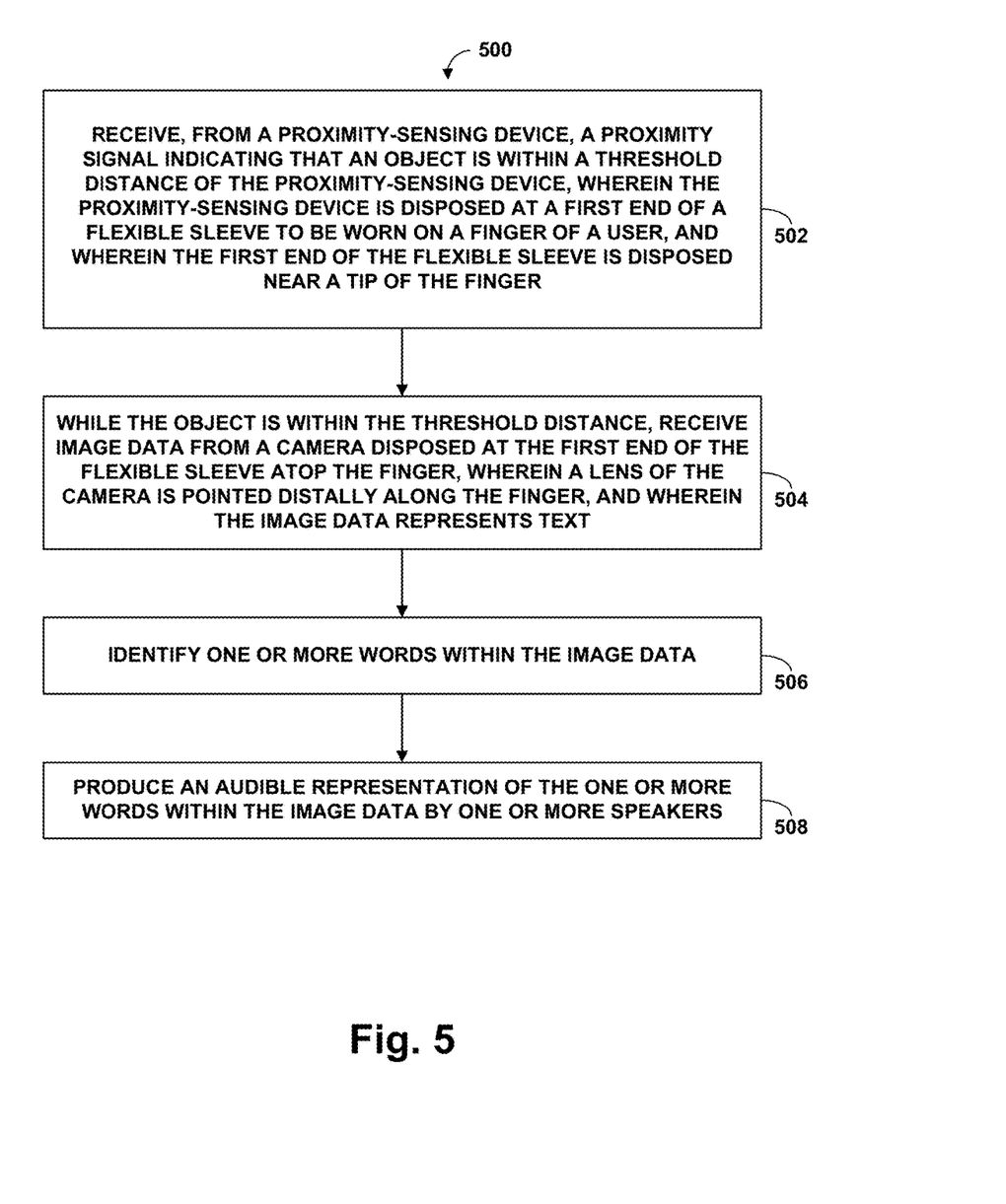
FIG. 5 illustrates another flow diagram, according to an example embodiment.

FIG. 5 illustrates another example flow diagram 500 of operations that may be performed by an assistive reading device, a computing device remote to the assistive reading device, or a combination thereof.

In block 502, a proximity signal may be received from a proximity-sensing device. The proximity signal may indicate that an object is within a threshold distance of the proximity-sensing device. Example proximity signals are discussed above with respect to FIGS. 1, 2, and 3. The proximity-sensing device may be disposed at a first end of a flexible sleeve to be worn on a finger of a user. The first end of the flexible sleeve may be disposed near a tip of the finger, as illustrated in FIG. 2.

In block 504, while the object is within the threshold distance, image data may be received from a camera disposed at the first end of the flexible sleeve atop the finger. A lens of the camera may be pointed distally along the finger. The image data may represent text.

In block 506, one or more words may be identified within the image data. In block 508, an audible representation of the one or more words within the image data may be produced by one or more speakers. The one or more speakers may be connected to and/or included on the assistive reading device or on the computing device. Alternatively, the speakers may be wireless and may be communicatively connected to one or more of the reading device or the computing device. One or more text-to-speech algorithms may be used to transform the recognized words into audible representations. In some embodiments, the scanned images and/or the recognized words may be stored to be analyzed and/or played back at a later time.

The operations of flow diagrams 400 and 500 may be performed to aid a user of the assistive reading device in reading, pronouncing, or translating one or more words. The assistive reading device may be used by users learning to read (e.g., kids), users with reading disorders (e.g., dyslexia), and/or users learning a new language.

Figure 6:
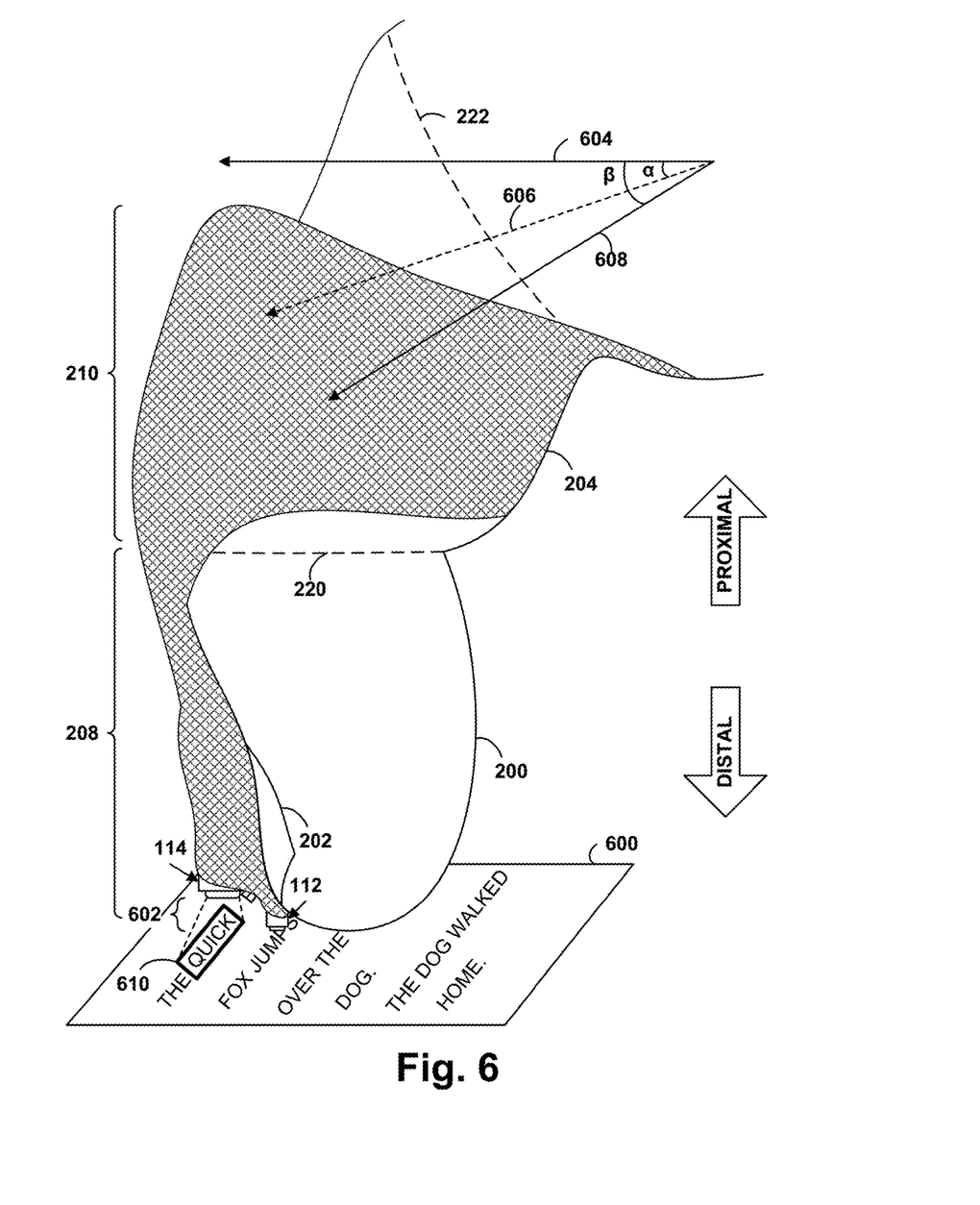
FIG. 6 illustrates an assistive reading device being used to capture images of a surface, according to an example embodiment.

FIG. 6 further illustrates the operations of an example assistive reading device. The reading device is shown with most components hidden between one or more layers of fabric making up flexible sleeve 204. Proximity-sensing device 112 and a portion of camera 114 (as well as illumination device 108 and camera FOV indicator 116) are not encased in the layers of flexible sleeve 204 to provide these components with a clear line of sight to objects, surfaces, and/or scenes in the environment.

In one example, to initiate image capture by camera 114 and subsequent recognition of words within the captured images, a user may bend finger 200 into the position illustrated in FIG. 6. Proximity-sensing device 112 may be placed in contact with surface 600 (e.g., a page of a book or magazine containing text to be read back to the user, as shown in FIG. 6) and may thus generate the proximity signal indicating that proximity-sensing device 112 is within a threshold distance of surface 600. Proximity-sensing device 112 may be a button or other contact sensor and may generate the proximity signal when it is depressed due to contact with surface 600. In some embodiments, proximity-sensing device 112 may be mounted further up (i.e., recessed from the fingertip in the proximal direction) from the tip of the finger such that gap 602 exists between proximity-sensing device 112 and surface 600 when the tip of finger 200 is brought into contact with surface 600. Gap 602 may be used with proximity-sensing devices operating by measuring time-of-flight of acoustic or electromagnetic waves.

Camera 114, illumination device 108, and camera FOV indicator 116 may likewise be recessed from the tip of finger 200, as shown in FIG. 6, to provide gap 602 between these components and surface 600 when the fingertip is brought into contact with surface 600. Accordingly, camera 114, illumination device 108, and camera FOV indicator 116 may be unobstructed when fingertip 600 is brought into contact with or close proximity of surface 600. Additionally, the size of gap 602 may be chosen such that surface 600 lies in a focal plane of camera 114 when the fingertip is brought into contact with surface 600.

FIG. 6 illustrates the scanning process occurring when finger 200 is bent. This finger orientation may be most common when a user is scanning text in a book or magazine resting on a horizontal surface. Finger 200 may be moved across a line of text to scan in images of the text. For example, as shown in FIG. 6, finger 200 may be positioned to aim camera 114 at the word "QUICK" on surface 600.

Camera FOV indicator 116 may aid the user in positioning finger 200 to keep the line of text intended to be scanned within the field of view of camera 114. In particular, camera FOV indicator 116 may project light pattern 610 that defines a boundary of the field of view of camera 114. The user may move finger 200 to reposition camera 114 and light pattern 610 over one or more words the user desires to scan, such as a word "QUICK" as shown in FIG. 6. The visual feedback of camera FOV indicator 116 and light pattern 610 may allow the user to selectively scan a word; e.g., the word "QUICK" by illuminating camera FOV indicator 116 when camera 114 is proximate to surface 600 to indicate region 610 begin scanned by camera 114. Camera FOV indicator 116 might not be illuminated when camera 114 is not proximate to object 600 to indicate a word is being skipped or not scanned. Visual feedback of camera FOV indicator 116 may allow the user to scan in multiple words in one line of text without accidentally drifting to other lines of text. Notably, the tip of finger 200 may remain exposed to allow for tactile feedback as the user glides finger 200 across a surface.

However, scanning may also occur when finger 200 is straight and is brought into contact or proximity of a surface to be scanned. For example, when scanning a label on a food item, the surface to be scanned may be vertical and thus finger 200 may be in the orientation illustrated in FIG. 2 when brought into contact or proximity of the surface. Thus, in general, the orientation of finger 200 during scanning is not limited to the examples shown herein. The assistive reading device 100 may operate to scan in image data when proximity-sensing device 112 generates the proximity signal, regardless of finger orientation. Scanning may persist while proximity-sensing device continues to output the proximity signal.

Further, the devices and operations herein described may also be used to scan barcodes such as a Universal Product Code (UPC) or a Quick Response (QR) code. Based on the scanned barcode, the devices may retrieve information associated with the barcode (e.g., product description, product price, product specifications, etc.) and produce audible representations of the retrieved information.

In some embodiments, one or more strain or flex sensors may be included within flexible sleeve 204. These sensors may be included to prevent undesired activation of reading device 100. In one example, camera 114 may initiate image capture when (i) the proximity signal is generated by proximity-sensing device 112 and (ii) the strain/flex sensors indicate that finger 200 is bent beyond a threshold angle. The threshold angle may be, for example, angle α between line 604 (representing the finger angle shown in FIG. 2) and line 606, as shown in FIG. 6. Thus, when the flex/strain sensors indicate that finger 200 is bent to angle β (i.e., angle between lines 604 and 608) that exceeds angle α and proximity-sensing device 112 is brought into contact with surface 600, camera 114 may initiate image data capture. Image capture may continue while proximity-sensing device 112 remains in contact with surface 600 and the angle of finger 200 remains above threshold angle α. This two-step activation process may reduce the incidence of scans that are unintended by the user (e.g., when proximity-sensing device 112 is unintentionally brought within the threshold distance of an object) and may allow reading device 100 to be worn on the finger for prolonged periods without expanding battery life on the unintended scans. The user may be able to select the event or combination of events that triggers image acquisition by changing one or more settings of the assistive reading device.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
   a flexible sleeve to be worn on a finger of a user, wherein a first end of the flexible sleeve is disposed near a tip of the finger, and wherein the flexible sleeve comprises two or more layers of fabric;
   a camera disposed at the first end of the flexible sleeve atop the finger, wherein a lens of the camera is pointed distally along the finger, and wherein at least a portion of the camera is disposed between the two or more layers of fabric;
   a proximity-sensing device disposed at the first end of the flexible sleeve, wherein the proximity-sensing device is configured to generate a proximity signal when an object is within a threshold distance of the proximity-sensing device; and
   a computing device connected to the flexible sleeve and configured to:
      receive, from the proximity-sensing device, the proximity signal indicating that the object is within the threshold distance of the proximity-sensing device;
      while the object is within the threshold distance, receive image data from the camera; and
      transmit the image data.

2. The system of claim 1, wherein the computing device is further configured to:
   in response to receiving the proximity signal from the proximity-sensing device, provide instructions to initiate capture of the image data by the camera.

3. The system of claim 1, wherein the computing device is further configured to:
   receive an out-of-proximity signal from the proximity-sensing device indicating that the object is not within the threshold distance of the proximity-sensing device; and
   in response to receiving the out-of-proximity signal, deactivate the camera.

4. The system of claim 1, wherein the flexible sleeve comprises:

a cylindrical ring section to be worn about an intermediate phalange of the finger of the user; and an arced section extending from the cylindrical ring section over at least a portion of a distal phalange of the finger of the user, the arced section defining the first end of the flexible sleeve.

5. The system of claim 4, further comprising:

a wireless transmitter disposed within the cylindrical ring section of the flexible sleeve and configured to transmit the image data; and a battery disposed within the cylindrical ring section of the flexible sleeve to power the camera, the proximity-sensing device, the wireless transmitter, and the computing device.

6. The system of claim 1, wherein the proximity-sensing device comprises a button, and wherein the button is configured to generate the proximity signal when the button is brought into physical contact with the object.

7. The system of claim 6, wherein the button is disposed above the tip of the finger, and wherein the camera is recessed from the tip of the finger to provide a gap between the lens of the camera and the object when the tip of the finger is brought into physical contact with the object.

8. The system of claim 1, further comprising:

an illumination device disposed on the first end of the flexible sleeve and configured to light the object in response to receiving the proximity signal from the proximity-sensing device.

9. The system of claim 8, wherein the computing device is further configured to:

receive data indicative of ambient light intensity from a light intensity sensor on a remote computing device; and based on the ambient light intensity, modulate an intensity with which the illumination device lights the object.

10. The system of claim 9, wherein the computing device is further configured to:

modulate the intensity with which the illumination device lights the object in inverse proportion to the ambient light intensity.

11. The system of claim 1, further comprising a remote computing device, configured to:

receive the image data, wherein the image data represents text;

identify one or more words within the text; and produce an audible representation of the one or more words within the text.

12. The system of claim 11, wherein the remote computing device is configured to identify one or more words within the text using one or more optical character recognition (OCR) algorithms.

13. The system of claim 11, wherein the remote computing device is further configured to:

receive an indication of a target language to which to translate the one or more words;

translate the one or more words to the target language; and produce an audible representation of the one or more words in the target language.

14. The system of claim 11, further comprising:

one or more speakers disposed within the flexible sleeve, wherein the remote computing device is configured to produce the audible representation of the one or more words within the text by providing instructions to the computing device to produce the audible representation by the one or more speakers disposed within the flexible sleeve.

15. The system of claim 11, wherein the remote computing device is configured to produce the audible representation of the one or more words within the image data using one or more speakers of the remote computing device.

16. The system of claim 1, further comprising:

a visual feedback device disposed at the first end of the flexible sleeve and configured to project an indication of a field of view of the camera in response to receiving the proximity signal from the proximity-sensing device.

17. A method comprising:

receiving, by a computing device, a proximity signal from a proximity-sensing device indicating that an object is within a threshold distance of the proximity-sensing device, wherein the proximity-sensing device is disposed at a first end of a flexible sleeve to be worn on a finger of a user, wherein the first end of the flexible sleeve is disposed near a tip of the finger, and wherein the computing device is connected to the flexible sleeve;

receiving, by the computing device and from a light intensity sensor, data indicative of ambient light intensity;

based on the ambient light intensity, modulating an intensity with which an illumination device lights the object, wherein the illumination device is disposed on the first end of the flexible sleeve and is configured to light the object in response to receiving the proximity signal from the proximity-sensing device;

while the object is within the threshold distance, receiving, by the computing device, image data from a camera disposed at the first end of the flexible sleeve atop the finger, wherein a lens of the camera is pointed distally along the finger; and transmitting, by the computing device, the image data.

18. The method of claim 17, further comprising:

receiving, by a remote computing device, the image data, wherein the image data represents text;

identifying, by the remote computing device, one or more words within the image data; and producing an audible representation of the one or more words within the image data.

19. A system comprising:

a flexible sleeve to be worn on a finger of a user, wherein a first end of the flexible sleeve is disposed near a tip of the finger;

a camera disposed at the first end of the flexible sleeve, wherein a lens of the camera is pointed distally along the finger;

a proximity-sensing device disposed at the first end of the flexible sleeve, wherein the proximity-sensing device is configured to generate a proximity signal when an object is within a threshold distance of the proximity-sensing device;

an illumination device disposed on the first end of the flexible sleeve and configured to light the object in response to receiving the proximity signal from the proximity-sensing device; and a computing device connected to the flexible sleeve and configured to:

receive, from the proximity-sensing device, the proximity signal indicating that the object is within the threshold distance of the proximity-sensing device;

receive data indicative of ambient light intensity from a light intensity sensor;

based on the ambient light intensity, modulate an intensity with which the illumination device lights the object;

while the object is within the threshold distance, receive image data from the camera; and transmit the image data.

20. The system of claim 19, wherein the light intensity sensor is disposed on a remote computing device.

* * * * *